United States Patent [19]
Choules

[11] 3,771,374
[45] Nov. 13, 1973

[54] OUT-OF-BALANCE WEIGHT ASSEMBLIES

[75] Inventor: Marcel Henry Choules, Surrey, England

[73] Assignee: Russell Finex Limited, London, England

[22] Filed: Aug. 11, 1972

[21] Appl. No.: 279,885

[30] Foreign Application Priority Data
Aug. 16, 1971 Great Britain.................38375/71

[52] U.S. Cl............................... 74/87, 259/DIG. 42
[51] Int. Cl.............................................. F16h 33/10
[58] Field of Search................................. 74/61, 87; 259/DIG. 42; 209/366.5

[56] References Cited
UNITED STATES PATENTS
| | | | |
|---|---|---|---|
| 2,774,244 | 12/1956 | Bergstrom et al. | 74/61 |
| 3,097,537 | 7/1963 | Peterson | 74/61 |
| 3,491,881 | 1/1970 | Winquist | 74/61 X |
| 3,640,508 | 2/1972 | Reibig | 74/87 X |

Primary Examiner—Allan D. Herrmann
Attorney—John A. Mawhinney

[57] ABSTRACT

An out-of-balance weight assembly as used for example on vibratory sieves, shakers tables, ball mills or the like, and comprising a weight having an eccentric bush adjustably mounted in a bore in the weight. Means to restrain relative movement between the weight and the bush, and the bush and a driving shaft are provided. The out-of-balance balance component, and/or the angle thereof relative to the shaft when the shaft is rotated may be varied by rotational adjustment of the weight and/or the bush about the shaft.

9 Claims, 3 Drawing Figures

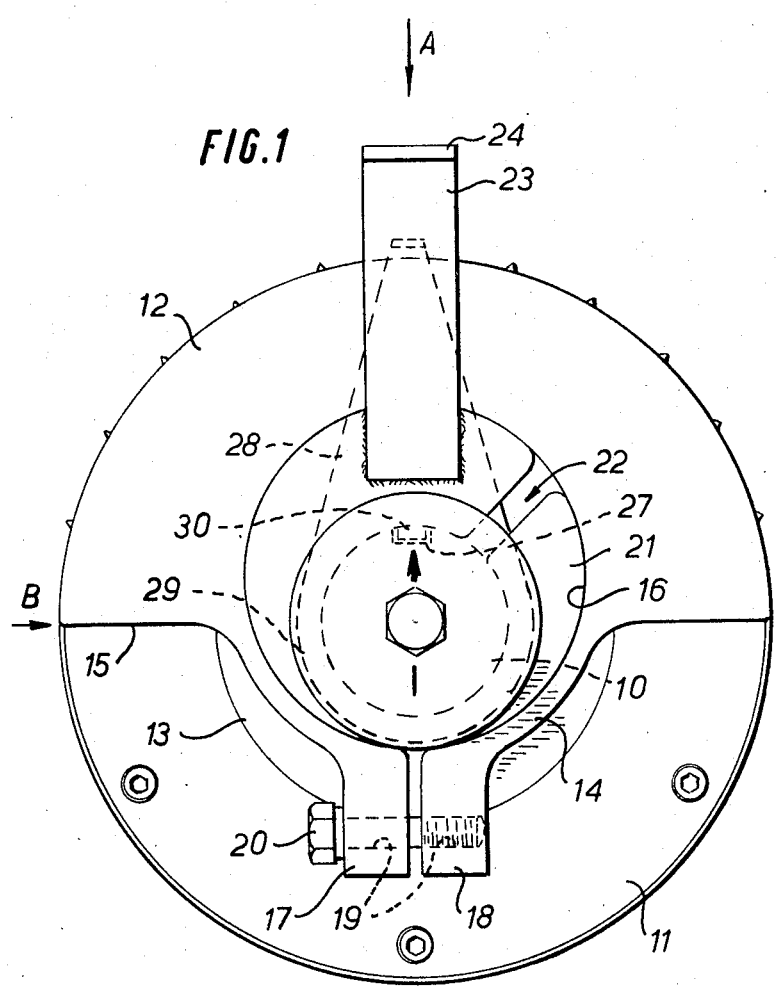

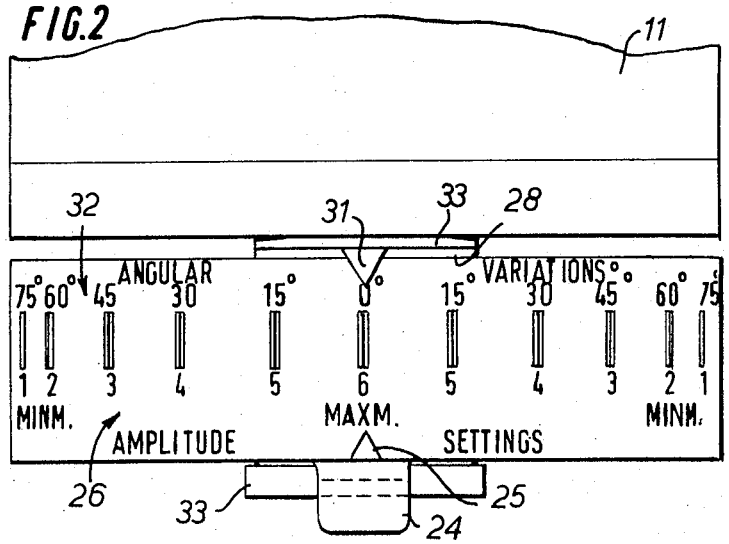
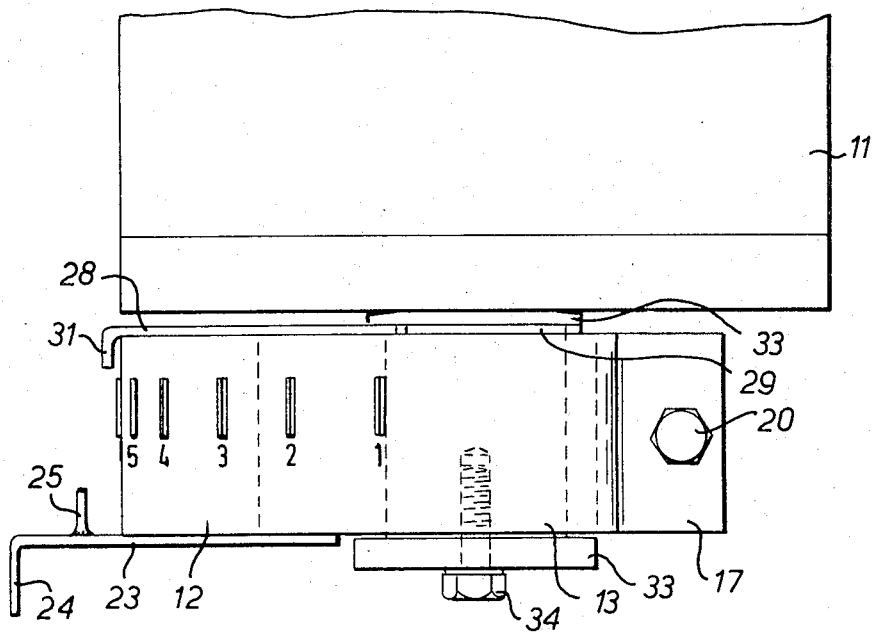

OUT-OF-BALANCE WEIGHT ASSEMBLIES

BACKGROUND OF THE INVENTION

The invention relates to out-of-balance assemblies for use on vibratory apparatus such as, for example, sieves, strainers, balls mills, tables and the like. It is frequently desirable in such vibratory apparatus to vary the magnitude of the out-of-balance component generated by the assembly, and it is common to attach or remove subsidiary weights to a main weight in order to vary the out-of-balance component. In addition, and in particular when two out-of-balance weights are connected together for joint rotation, it is frequently desirable to alter the angle between the out-of-balance components generated by the two weights.

SUMMARY OF THE INVENTION

It is an object of the invention to provide an out-of-balance weight assembly in which the out-of-balance component and the angle thereof with respect to a driving shaft may be readily and easily adjusted. In accordance with this object, the invention provides an out-of-balance weight assembly comprising a weight, a bore extending through the weight, a bush fitting within said bore, means for adjusting the bush about the axis of said bore, the bore of the bush being eccentrically disposed relative to the outer surface of the bush and being capable of receiving a driving shaft for the weight, and means to restrain the bush against rotation with respect to the weight and with respect to the shaft, whereby the out-of-balance component or the angle thereof with respect to the shaft generated by rotation of the weight about the axis of the bore of the bush may be varied by adjusting the bush in the bore of the weight.

The weight may be provided with a slot extending between the bore of the weight and the outer periphery of the weight for the length of the bore, the restraining means being arranged to close the slot to clamp the weight to the bush.

The wall of the eccentric bush may be discontinuous so that when the bush is mounted on a shaft and the weight is clamped to the bush, the bush is also clamped to the shaft.

In any of the above arrangements the means for adjusting of the bush with respect to the weight may comprise a lever attached to the bush and extending radially outwardly therefrom.

The adjusting means may include means to indicate the relative angular position of the bush with respect to the weight.

Means may be provided for indicating the relative angular position of the out-of-balance weight assembly with respect to a datum provided on a shaft on which the assembly is mounted.

BRIEF DESCRIPTION OF THE DRAWINGS

The following is a description of one preferred embodiment of the invention, and given by way of example. Reference is made to the accompanying drawings in which:

FIG. 1 is a plan view of an adjustable out-of-balance weight assembly;

FIG. 2 is a view on arrow A on FIG. 1; and

FIG. 3 is a view on arrow B on FIG. 1.

DESCRIPTION OF THE PREFERRED EMBODIMENT

The out-of-balance weight assembly is intended for clamping to a driving shaft 10, which, in the embodiment shown in the drawings, is a stub driving shaft which projects from an electric motor 11, or from a vibrator housing.

The out-of-balance weight 12 of the assembly is generally semi-circular, and has a pair of jaws 13, 14, projecting from the edge 15 of the main body thereof. The inner surfaces of the jaws together with a part of the base wall define a cylindrical bore 16 formed in the weight. The jaws terminate in flanges 17 and 18 lying substantially parallel to one another and closely spaced apart, there being a hole 19 extending through the two flanges substantially perpendicular to their planes. The hole 19 in the flange 18 is threaded to receive a bolt 20 which fits with clearance through the hole 19 in the other flange 17. Tightening the bolt closes the gap between the two flanges 17 and 18.

Located within the bore 16 is a split bush 21, the outer surface of which is cylindrical and fits closely within the bore 16, and the inner surface of which is also cylindrical and fits closely around the shaft 10. The axis of the inner surface is eccentric with the outer surface. The wall of the bush 21 is discontinuous at a location 22 part-way between the parts of the bush having greatest and least radial wall thickness. The discontinuity may be at any other part of the bush, but is preferably at the location shown.

A lever 23 is welded to the part of the bush having the greatest wall thickness, and extends radially outwardly therefrom, lying adjacent the radial surface of the weight, the end 24 of the lever being turned downwardly to lie perpendicular to the general plane of the lever. A triangular pointer 25 is welded to the lever 23 and upstands therefrom to lie adjacent the cylindrical periphery of the weight. The cylindrical periphery of the weight is calibrated as shown at 26, against which the pointer 25 indicates.

The shaft 10 is provided with a keyway 27, there being a further pointer 28 lying over the upper radial surface of the weight 12 and having an eye 29 encircling the shaft. The eye 29 is provided with a lug 30 which engages the keyway 27, and the radially outer end 31 of the further pointer 28 is turned over to lie adjacent the cylindrical periphery of the weight 12. Further calibrations 32 are provided on the cylindrical periphery of the weight, against which the further pointer indicates the relative angular position of the weight with respect to the keyway 27 on the shaft 10.

The shaft 10 is provided with a shoulder 33 on which one end of the bush 21 abuts, and the assembly is restrained on the shaft by means of a flat washer 33 abutting the other end of the bush and the lower radial face of the weight, the washer 33 being held in place by a bolt 34 threaded into an axially extending threaded bore provided in the shaft 10.

In use, the weight 12 is clamped to the bush 21 by tightening the bolt 20, which thus deforms the shape of the bore 16. Clamping the weight on to the split bush 21 also clamps the bush 21 on to the shaft 10, whereby a driving connection is achieved between the shaft and the weight 12. The amplitude of the out-of-balance force produced when the weight assembly is rotated may be varied by loosening the bolt 20 and rotating the split bush 21 relative to the weight 12, by means of the lever 23, and then retightening the bolt 20. The amplitude is indicated empirically on the calibrations 26.

When the bolt is loosened, the angular position of the weight assembly, and hence the direction of the out-of-balance force when the assembly is rotated, with respect to a datum on the shaft may be varied, and the angular position relative to this datum is indicated on the calibrations 32 by the further pointer. This feature is of particular application when the driving shaft carries a second out-of-balance weight assembly (which need not be adjustable. The resultant force of the two (or more, if provided) out-of-balance weights may thus be varied by changing their relative angular positions. For example, the motor shaft 10 projecting from the housing 11 may also project from the further end (not shown) of the housing 11, and the second out-of-balance weight is then attached to the other end of the shaft.

Such out-of-balance weight assemblies have particular, but not exclusive, applications to various forms of vibrating apparatus, for example, sieves, strainers, vibratory mills, and the like, where it may be desired to vary the amplitude or force of vibrations and also to change the angular relationship of the force to a datum or a second out-of-balance weight.

I claim:

1. An out-of-balance weight assembly comprising a weight, a bore extending through the weight, a bush fitting within said bore, means for adjusting the bush about the axis of said bore, the bore of the bush being eccentrically disposed relative to the outer surface of the bush and being capable of receiving a driving shaft for the weight, and means to restrain the bush against rotation with respect to the weight and with respect to the shaft, whereby the out-of-balance component or the angle thereof with respect to the shaft generated by rotation of weight about the axis of the bore of the bush may be varied by adjusting the bush in the bore of the weight.

2. An out-of-balance weight assembly according to claim 1, in which the weight is provided with a slot extending between the bore of the weight and the outer periphery of the weight for the length of the bore, the restraining means being arranged to close the slot to clamp the weight to the bush.

3. An out-of-balance weight assembly according to claim 2, in which the wall of the eccentric bush is discontinuous so that when the bush is mounted on a shaft and the weight is clamped to the bush, the bush is also clamped to the shaft.

4. An out-of-balance weight assembly according to claim 3, in which the means for adjusting the bush with respect to the weight comprises a lever attached to the bush and extending radially outwardly therefrom.

5. An out-of-balance weight assembly according to claim 4, in which the adjusting means includes means to indicate the relative angular position of the bush with respect to the weight.

6. An out-of-balance weight assembly according to claim 5, in which means are provided for indicating the relative angular position of the out-of-balance weight assembly with respect to a datum provided on a shaft on which the assembly is mounted.

7. An out-of-balance weight assembly according to claim 1, in which the means for adjusting the bush with respect to the weight comprises a lever attached to the bush and extending radially outwardly therefrom.

8. An out-of-balance weight assembly according to claim 1, in which the adjusting means includes means to indicate the relative angular position of the bush with respect to the weight.

9 An out-of-balance weight assembly according to claim 1, in which means are provided for indicating the relative angular position of the out-of-balance weight assembly with respect to a datum provided on a shaft on which the assembly is mounted.

* * * * *